(12) United States Patent
Kiss

(10) Patent No.: US 7,479,251 B2
(45) Date of Patent: Jan. 20, 2009

(54) DEVICE AND METHOD FOR CASTING AND DRAWING OUT MOLTEN IRON-CONTAINING AND MINERAL MATERIALS

(75) Inventor: Günter H. Kiss, Fürstentum (LI)

(73) Assignee: Thermoselect Aktiengesellschaft (LI)

( * ) Notice: Subject to any disclaimer, the term of this patent is extended or adjusted under 35 U.S.C. 154(b) by 433 days.

(21) Appl. No.: 10/551,512

(22) PCT Filed: Feb. 27, 2004

(86) PCT No.: PCT/EP2004/001962

§ 371 (c)(1),
(2), (4) Date: Jan. 13, 2006

(87) PCT Pub. No.: WO2004/087588

PCT Pub. Date: Oct. 14, 2004

(65) Prior Publication Data

US 2006/0201204 A1 Sep. 14, 2006

(30) Foreign Application Priority Data

Apr. 2, 2003 (DE) ................................. 103 15 007

(51) Int. Cl.
*C03B 9/193* (2006.01)
(52) U.S. Cl. ...................................... 266/271; 222/597
(58) Field of Classification Search ................. 266/271; 222/597
See application file for complete search history.

(56) References Cited

U.S. PATENT DOCUMENTS

| 1,572,580 | A | | 2/1926 | Troutman et al. |
| 1,643,601 | A | | 9/1927 | Beebe |
| 2,186,718 | A | | 1/1940 | Ferguson |
| 4,498,610 | A | | 2/1985 | Wooding ..................... 222/592 |
| 5,225,145 | A | * | 7/1993 | Winch ......................... 266/271 |
| 5,333,839 | A | * | 8/1994 | Lonardi et al. .............. 266/271 |
| 5,567,218 | A | | 10/1996 | Ladirat et al. ................. 65/327 |

FOREIGN PATENT DOCUMENTS

| EP | 0 526 685 A2 | 2/1993 |
| EP | 0 976 806 A1 | 2/2000 |
| WO | WO 00/17590 | 3/2000 |

OTHER PUBLICATIONS

Translation of the International Preliminary Report on Patentability dated Mar. 2, 2006 from the corresponding international application.
International Search Report dated May 26, 2004.
"Thermoselect-Vergasung von Abfällen unter Atmosphärendruck zur Energie-und Rohstoffgewinnung," Dipl-ing K. Klein and Professor Dr. rer. nat. habil. R. Stahlberg, no date.

* cited by examiner

*Primary Examiner*—Scott Kastler
(74) *Attorney, Agent, or Firm*—Young Basile

(57) ABSTRACT

The invention relates to a melting furnace having an electric or external heating system for storing melts and having a melt discharge outlet comprising a cooling device. An instrument for mechanically removing plugs which are blocking the melt discharge outlet is arranged at the melt discharge outlet.

12 Claims, No Drawings

DEVICE AND METHOD FOR CASTING AND DRAWING OUT MOLTEN IRON-CONTAINING AND MINERAL MATERIALS

BACKGROUND OF THE INVENTION

The invention relates to a device and a method for the trouble-free drawing-off or casting of hot melts which are kept in storage until they are converted into a casting.

In high-temperature technology, the handling of liquid melts is a task which is frequently encountered. The handling of liquid melts at temperatures above 1000° C. is to be found for example in foundry practice, in the glass industry or in high-temperature gasification in accordance with the THERMOSELECT process, to mention just a few examples. Basically the melts are stored in melting furnaces, which are provided with an electric or external heating system, and are then cast or drawn-off for further processing (continuous casting, surface casting, dead-mould casting or similar).

In the case of high-temperature gasification according to the THERMOSELECT process of different types of waste, such as domestic, industrial or special waste, unsorted waste is for example introduced into a reactor. The inorganic constituents, e.g. iron, are melted at temperatures of approx. 2000° C. The mineral melt is then passed over a cooled copper ring and granulated with $H_2O$. Above the cooling ring are arranged burners in order to guide the melt securely into the granulating system.

What is problematic about these methods, especially the THERMOSELECT process, is the formation of so-called "plugs" at the outflow. Due to the formation of such solidified melt plugs at the outflow from the furnaces, very often interruptions in or problems with operation occur. For example in the THERMOSELECT process, where there are large proportions of iron, the melt, which solidifies as it flows out, begins after some time to adhere to the cooling ring. A plug is formed. Only after the plug has been manually removed can the process of casting be continued.

SUMMARY OF THE INVENTION

The object of the present invention is now to quote a device and a method which make possible a continuous, trouble-free casting or outflow of liquid melts, which are hotter than 1000° C., from the storage devices.

This object is accomplished by the development of a melting furnace having an electric or external heating system for storing melts and having a melt discharge outlet comprising a cooling device, characterised in that an instrument for mechanically removing plugs blocking the melt discharge outlet is arranged at the melt discharge outlet, the instrument for removing plugs being mounted at the side of the melt discharge outlet and not blocking the melt discharge outlet when in a rest position, and the instrument for removing the plugs can be moved in the plane perpendicular to the outflow direction of the melt and a method for removing plugs which have formed on the melt discharge outlet and which are blocking the melt discharge outlet, characterised in that the plugs are removed by breaking- or knocking- or splitting-away with the aid of the instrument for removing plugs.

DETAILED DESCRIPTION OF THE PREFERRED EMBODIMENT

Accordingly, an instrument (hereinafter referred to as a plug-remover) is provided for the mechanical removal of plugs which form as a result of solidification at the outflow of a container storing the melt. The solidification of the melt occurs because the melt discharge outlet includes a cooling device in one form or another. For example this cooling can take place in that the outflow is exposed to ambient temperatures. According to the invention, the plug-remover is mounted at the side of the melt discharge outlet and does not block the melt discharge outlet when in a rest position.

The advantageous effect of this invention lies in the possibility of maintaining the operation of the discharge for the melt without any manual intervention.

In a preferred embodiment, the invention provides a water-cooled copper outflow ring arranged above the melt discharge outlet. Due to the high thermal conductivity of the copper ring, no fixed connections can form between the plug and the outflow ring. Furthermore, a melt discharge outlet of preferably 200 mm to 800 mm, by very special preference of 500 mm, is used.

An advantage of the invention is given in that the plug-remover pauses in a rest position or even end position before the removal process is carried out. In its end position the plug-remover does not block the discharge.

In a further preferred variant, the rest position is designed as a cooled area. It is an obvious idea here to shield this area from the radiation used for heating the melt container. In this connection, an embodiment is also conceivable according to which the plug-remover is cooled by an internal cooling system, and this prevents material fatigue. Also in order to prevent tension or material fatigue, a housing can be formed as a cooled cast structure around the rest position of the plug-remover.

In respect of the movement of the plug-remover, a preferred embodiment provides for movement in the plane perpendicular to the outflow direction. The cutter is moved on a circular path which covers the entire melt discharge outlet. The spacing between the plane of movement of the plug-remover and outflow ring is as short as possible. It should not be more than 420 mm, but preferably even less than 200 mm. In order permanently to prevent plug formation, movements with cycle times of 1 to 3, preferably 2 seconds are proposed.

In a further embodiment, the plug-remover can take the form of a sword-shaped cutter. In this connection a hydraulic drive mechanism for the cutter has proved to be particularly efficient.

In a further embodiment, a recording mechanism triggered by the plug-remover is provided. This recording mechanism detects whether the plug-remover has assumed its end position. If the plug-remover does not reach its end position, which implies the formation of a plug which cannot be removed by the plug-remover, an oxygen lance melting the plug above the discharge is automatically switched on. Thus the plug is cut away or oxidised by a mechanism similar to a cutting torch. Alternatively, one or more 3-channel burners are arranged above the cooled copper outflow ring, in order in this case to keep the melt discharge outlet free from solidified material.

The invention claimed is:

1. Melting furnace having an electric or external heating system for storing melts and having a melt discharge outlet comprising a cooling device, characterised in that an instrument for mechanically removing plugs blocking the melt discharge outlet is arranged at the melt discharge outlet, the instrument for removing plugs being mounted at the side of the melt discharge outlet and not blocking the melt discharge outlet when in a rest position, the instrument for removing the plugs movable in the plane perpendicular to the outflow direction of the melt, and the instrument for removing the plugs having an internal cooling system, wherein the instrument can be moved in a circular path.

2. Device according to claim 1, characterised in that the instrument has a hydraulic drive mechanism.

3. Device according to claim 1, characterised in that the instrument for removing the plugs is sword-shaped, the cutting edge being aligned in the plane perpendicular to the outflow direction of the melt.

4. Device according to claim 1, characterised in that the melt discharge outlet has a diameter of 200 mm to 800 mm, preferably 500 mm.

5. Device according to claim 1, characterised in that a water-cooled copper ring is arranged above the melt discharge outlet.

6. Device according to claim 1, characterised by a recording mechanism which is triggered by the instrument for removing the plugs in the rest position, for detecting this position of the instrument for removing the plugs.

7. Method for removing plugs which have formed on a melt discharge outlet given according to claim 1 and which are blocking the melt discharge outlet, characterised in that the plugs are removed by breaking- or knocking- or splitting-away with the aid of the instrument for removing plugs given according to claim 6, wherein the instrument for removing plugs moves in a circular path which covers the entire melt discharge.

8. Device according to claim 7, characterised in that the rest position is cooled and shielded from the heat radiation heating the melting furnace.

9. Method according to claim 7, characterised in that the knocking-, breaking- or splitting-away process is undertaken periodically with cycle times of 1 to 3 seconds.

10. Method according to claim 7, characterised in that the instrument for removing plugs is moved in a plane perpendicular to the outflow of the melt.

11. Method according to claim 7, characterised in that the instrument for removing plugs is moved hydraulically.

12. Method according to claim 7, characterised in that the instrument for removing the plugs triggers in its rest position a mechanism for recording that it has assumed the end position, and when the rest position has not been assumed by the instrument for removing the plugs within a preset time interval, a more intensive mechanism for removing plugs is switched on or a warning signal is emitted.

* * * * *